(No Model.)　　　　　　　　　　J. STANLEY.　　　　3 Sheets—Sheet 1.
BRIDLE BIT.

No. 538,049.　　　　　　　　　　　　　　Patented Apr. 23, 1895.

Witnesses　　　　　　　　　　　　　　　　　　Inventor
Robert Sollberger
Louisa Browne.　　　　　　　　James Stanley,
　　　　　　　　　　　　　　　　By Drake & Co, Atty's.

(No Model.) 3 Sheets—Sheet 2.

J. STANLEY.
BRIDLE BIT.

No. 538,049. Patented Apr. 23, 1895.

Witnesses
Robert Sollberger
Louisa Browne

Inventor:
James Stanley,
By Drake & Co. Atty's.

(No Model.) 3 Sheets—Sheet 3.
J. STANLEY.
BRIDLE BIT.
No. 538,049. Patented Apr. 23, 1895.
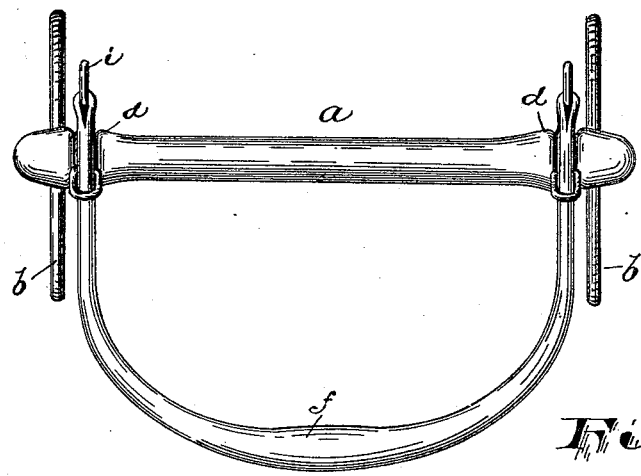
Fig. 5.
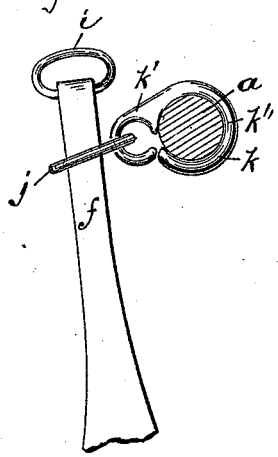
Fig. 6.
Fig. 9.
Fig. 7.
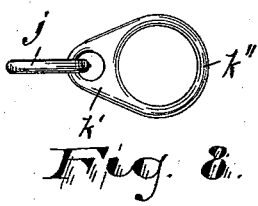
Fig. 8.
Witnesses
Robert Sollberger
Louisa Browne
Inventor,
James Stanley,
By Drake & Co Atty's

UNITED STATES PATENT OFFICE.

JAMES STANLEY, OF NEWARK, NEW JERSEY.

BRIDLE-BIT.

SPECIFICATION forming part of Letters Patent No. 538,049, dated April 23, 1895.

Application filed July 3, 1894. Serial No. 516,423. (No model.)

*To all whom it may concern:*

Be it known that I, JAMES STANLEY, a citizen of the United States, residing at Newark, in the county of Essex and State of New Jersey, have invented certain new and useful Improvements in Bridles and Bits; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to that class of bridle bits for horses having straps or pieces arranged in connection therewith and adapted to extend over the nose and under the chin of the animal to avoid the use of check bits and the objections inherent therein, and yet enable the horse to be fully controlled; to secure increased comfort to the animal and prevent injury to the same in driving.

The objects of the invention are to reduce the cost of construction, to secure increased durability and strength, to secure a more perfect protection for the horse's mouth, and to secure other advantages and results some of which will be hereinafter referred to in connection with the description of the working parts.

The invention consists in the improved bit and in the arrangements and combination of the parts thereof and connected therewith as will be hereinafter set forth and finally embraced in the clauses of the claim.

Figure 1:
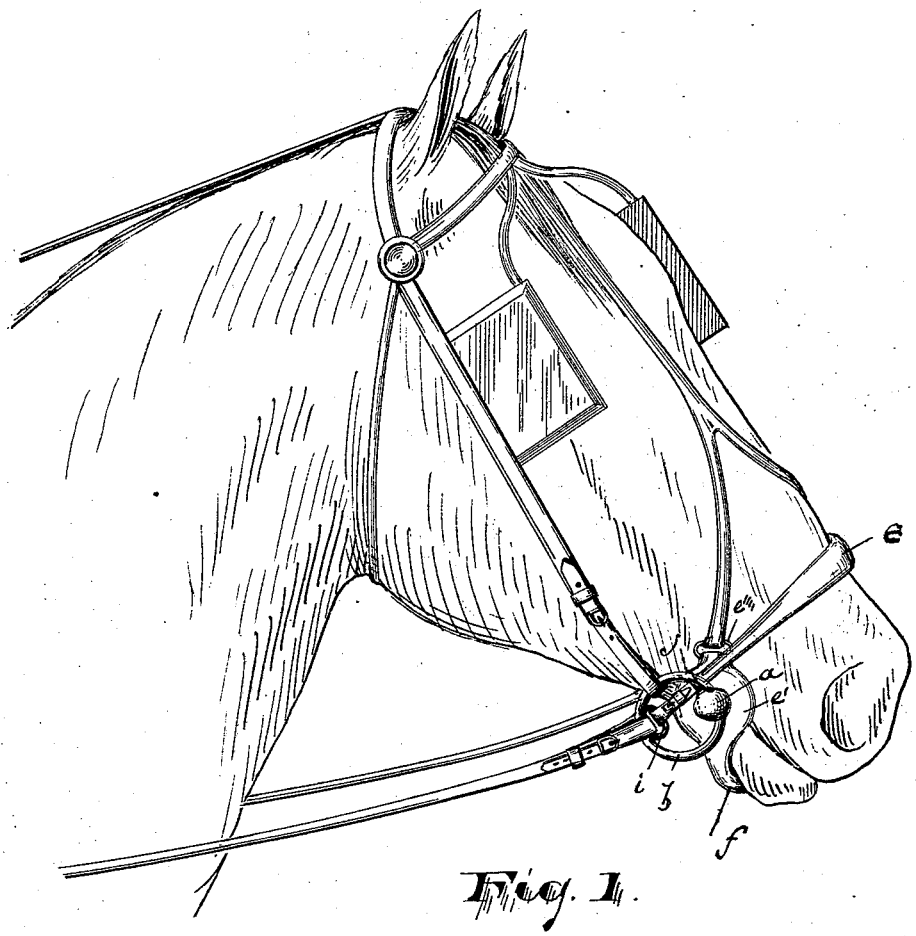
Figure 2:
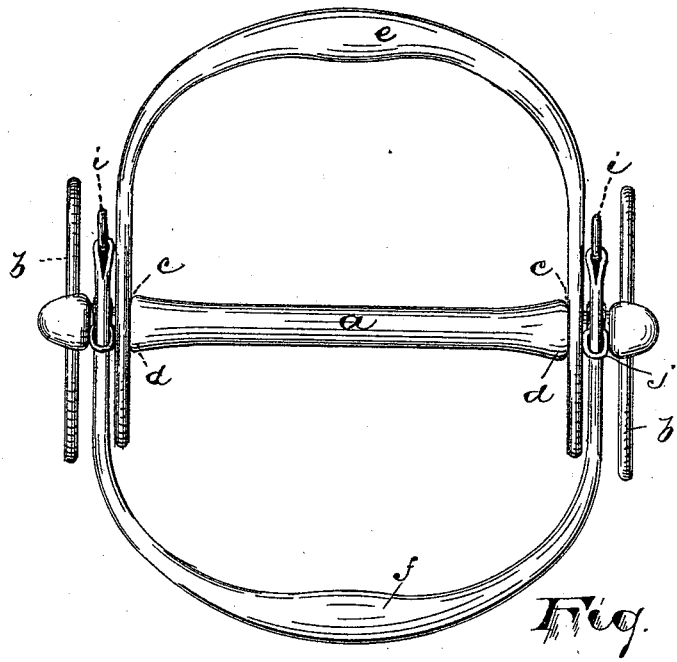
Figure 3:
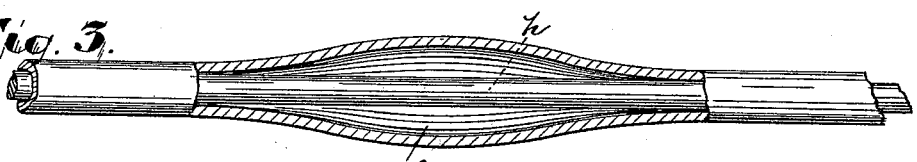
Figure 4:
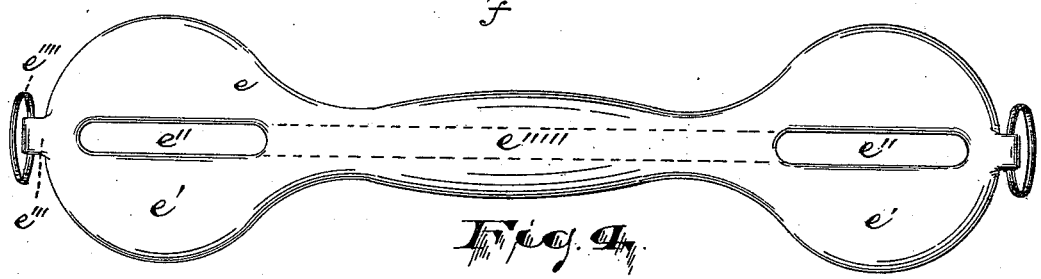

Referring to the accompanying drawings, in which like letters of reference indicate corresponding parts in each of the views, Figure 1 is a side elevation showing the nose band and cheek piece in their relations to the horse's head and harness. Fig. 2 is a plan of the bit. Fig. 3 is a detail of the chin strap or piece partly broken away to show the construction of the same more clearly. Fig. 4 is a plan of the nose strap detached from the bit. Fig. 5 is a plan of the bit having the chin strap alone in connection therewith. Fig. 6 illustrates the method and means of connecting the chin strap to the mouth piece more clearly. Figs. 7 and 9 illustrate, in detail, the links employed in connecting said chin strap to said mouth piece, and Fig. 8 shows a variation of construction.

In said drawings, $a$, indicates the mouth piece, and $b, b$, the cheek pieces of the bit which may be of any ordinary construction, but preferably the mouth piece consists of an iron core covered with rubber. At the ends of the mouth piece, closely adjacent to the heads thereof, at the inner sides of the cheek pieces, are formed peripheral recesses, $c, c$, which serve as receptacles for the chin and nose straps or pieces. Said recesses, or the abutments, $d, d$, adjacent thereto, serve to hold the said straps or pieces close to the cheek pieces and to prevent them from interfering with the lips of the horse. $e$, indicates the nose strap or piece which extends over the upper jaw or nose of the horse from the mouth piece, and $f$, indicates the chin strap which extends underneath the lower jaw from said mouth piece. The said chin strap connects with the check rein of the harness, or, in some cases being a continuation of said check rein. The nose piece may be connected or attached to the driving reins and the cheek pieces or rein rings of the bit.

The nose piece is preferably constructed as indicated in Fig. 4, and consists of a casting or molded piece of rubber or leather, which, at its opposite ends is expanded as at $e'$, the expanded parts being perforated as at $e''$, to allow a passage to the cheek pieces or rein rings, $b$. The said expanded parts present broad disk-like plates, which serve to protect the lips of the animal and guard them from the rein rings or other metallic parts.

In cases where there is considerable draft on the nose strap or piece, said strap may be provided with a metallic core, consisting of a chain, leather strap, or other suitable material having proper tensile strength.

By means of the perforations, $e''$, which are preferably in the form of slots of sufficient length to allow the passage of the cheek pieces therethrough, I am enabled to easily withdraw the said strap or piece from the mouth piece when I desire to employ the mouth piece and cheek pieces alone. The said slots also allow a certain limited but sufficient movement of the ends of the nose piece on the mouth piece, to enable the said nose piece to press on the nose of the horse, so as to compress his nostrils and prevent breathing, and thus control his actions, as will be understood.

The ends of the nose piece may be provided with eyes, $e'''$, adapted to receive the links $e''''$ for the reins. The reduced center part $e'''''$, of the nose piece is flat and rounded at the edges so as to engage the bridge of the nose and produce an easy bearing.

I may make the nose piece hollow, and especially is this true when the same is made of rubber, by which means the said piece is given a cushion-like effect, and is thereby made more easy and comfortable for the horse. The chin piece $f$, is also preferably made of rubber, although it may be made of other material, either solid or hollow, and may be provided with a metallic or other suitable core, $h$, (Fig. 3.) At the ends, the said chin piece is provided with check rein rings, $i$, and is preferably made narrow, as shown in Fig. 6, so as to slide in links, $j$, by means of which it is connected to coupling pieces $k$, arranged on the mouth piece. The coupling pieces are provided with eyes, $k'$, to receive the said links, $j$, and with a larger eye, $k''$, to engage the mouth piece. Said coupling pieces enter the recesses formed at the end of the mouth piece and thus are prevented from moving longitudinally on said mouth piece.

The larger eye, $k''$, is preferably open so that, by bending the metal thereof, the mouth piece may be inserted or withdrawn as will be understood upon reference to Fig. 7. The eyes of said coupling pieces may be closed as in Fig. 8.

While I have referred to the part $f$, as the chin strap or piece, and the part, $e$, as the nose strap or piece, it is evident that I may transpose the parts so that the part, $e$, will be employed in connection with the chin and the part $f$, in connection with the nose of the animal, as in Fig. 1.

Having thus described my invention, what I claim as new is—

1. The combination with the mouth piece, of the strap, $f$, links, $j$, and coupling, $k$, having large and small eyes, the larger eyes being arranged upon the mouth piece and the smaller eyes carrying the links, $j$, substantially as and for the purposes set forth.

2. The improved bridle bit for horses, in which is combined with the mouth piece, a strap, $f$, adapted to pass around the lower jaw of the horse, and at its opposite ends extending through links, $j$, and being provided with means of attachment with the check reins, said link, $j$, being coupled to the mouth piece, substantially as set forth.

3. The improved bridle bit for horses in which is combined with the mouth piece recessed at its opposite ends, a strap $f$, adapted to pass around the lower jaw of the horse, and, at its opposite ends, extending through coupling devices and being in connection with the check reins of the harness, the said coupling devices being arranged in the recesses of the mouth piece, substantially as set forth.

4. The combination with the mouth and cheek pieces of a bit, of a strap adapted to inclose the upper jaw of a horse, and connecting, at its ends, with the driving reins, and a strap adapted to inclose the lower jaw of a horse, and to connect with the check reins of the bridle, as described, and for the purposes set forth.

5. The combination of a mouth piece or bit having a recess near the opposite extremities thereof, a strap adapted to inclose one of the jaws of a horse and having enlarged ends with slots therein in which said recessed portions of the bit work, and means to hold said ends in said recesses, as described and for the purposes set forth.

In testimony that I claim the foregoing I have hereunto set my hand this 30th day of June, 1894.

JAMES STANLEY.

Witnesses:
CHARLES H. PELL,
LOUISA BROWNE.